(12) United States Patent
Kobayashi et al.

(10) Patent No.: US 10,246,041 B2
(45) Date of Patent: Apr. 2, 2019

(54) SIDE AIRBAG DEVICE

(71) Applicant: Autoliv Development AB, Vårgårda (SE)

(72) Inventors: Yuto Kobayashi, Yokohama (JP); Makoto Fuma, Yokohama (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 15/319,159

(22) PCT Filed: May 14, 2015

(86) PCT No.: PCT/JP2015/063922
§ 371 (c)(1),
(2) Date: Dec. 15, 2016

(87) PCT Pub. No.: WO2015/198739
PCT Pub. Date: Dec. 30, 2015

(65) Prior Publication Data
US 2017/0129446 A1    May 11, 2017

(30) Foreign Application Priority Data
Jun. 24, 2014 (JP) ................................ 2014-129419

(51) Int. Cl.
*B60R 21/2338* (2011.01)
*B60R 21/207* (2006.01)
(Continued)

(52) U.S. Cl.
CPC ...... *B60R 21/23138* (2013.01); *B60R 21/207* (2013.01); *B60R 21/235* (2013.01);
(Continued)

(58) Field of Classification Search
CPC ............ B60R 21/207; B60R 21/23138; B60R 21/2338; B60R 2021/23146; B60R 2021/23386
See application file for complete search history.

(56) References Cited

U.S. PATENT DOCUMENTS 5,636,862 A * 6/1997 Cheung ................. B60R 21/207
280/730.2
5,730,464 A * 3/1998 Hill ................... B60R 21/23138
280/730.2
(Continued)

FOREIGN PATENT DOCUMENTS

CN         1819938 A      12/2005
EP       1 470 969 A1      4/2003
(Continued)

OTHER PUBLICATIONS

PCT International Search Report—dated Aug. 4, 2015.

*Primary Examiner* — Barry Gooden, Jr.
(74) *Attorney, Agent, or Firm* — Brinks Gilson & Lione

(57) ABSTRACT

A side airbag device 1 having a tensioned tether 5 is attached to an outer surface of the airbag 2 on a side facing an occupant. The tether 5 has a shape with a front edge 5*a* vertical length a longer than a rear edge 5*b* vertical length. The front edge 5*a* continuously extends in a vertical direction along a front end 2*c* of the airbag 2 between upper and lower parts when deployed. The rear edge continuously extends in the vertical near a rear end 2*d* of the airbag 2 between the upper and lower parts. The front edge 5*a* joins in the vertical direction to the airbag 2 front end 2*c*, and the tether 5 moves in an oblique direction having a vertical and horizontal direction components in a state of being pulled in an oblique direction inclined to the vertical direction when deployed.

8 Claims, 3 Drawing Sheets

(51) Int. Cl.
  *B60R 21/231* (2011.01)
  *B60R 21/235* (2006.01)
  *B60R 21/237* (2006.01)

(52) U.S. Cl.
  CPC ........ *B60R 21/237* (2013.01); *B60R 21/2338* (2013.01); *B60R 2021/23146* (2013.01); *B60R 2021/23386* (2013.01); *B60R 2021/23509* (2013.01); *B60R 2021/23576* (2013.01)

(56) References Cited

U.S. PATENT DOCUMENTS

| | | | |
|---|---|---|---|
| 9,573,551 B1* | 2/2017 | Wang | B60R 21/2346 |
| 9,701,270 B2* | 7/2017 | Goto | B60R 21/233 |
| 9,796,351 B2* | 10/2017 | Fujiwara | B60R 21/207 |
| 2006/0038386 A1 | 2/2006 | Shibayama et al. | |
| 2006/0119082 A1* | 6/2006 | Peng | B60R 21/23138 |
| | | | 280/730.2 |
| 2006/0232054 A1* | 10/2006 | Schlosser | B60R 1/23138 |
| | | | 280/743.2 |
| 2007/0024033 A1* | 2/2007 | Suzuki | B60R 21/231 |
| | | | 280/730.2 |
| 2007/0096444 A1 | 5/2007 | Bostrom et al. | |
| 2007/0152430 A1* | 7/2007 | Wollin | B60R 21/233 |
| | | | 280/729 |
| 2015/0367803 A1* | 12/2015 | Fujiwara | B60R 21/207 |
| | | | 280/728.2 |
| 2015/0367804 A1* | 12/2015 | Fujiwara | B60R 21/207 |
| | | | 280/730.2 |
| 2016/0031407 A1* | 2/2016 | Yamanaka | B60R 21/233 |
| | | | 280/728.2 |
| 2016/0114755 A1* | 4/2016 | Matsuzaki | B60R 21/207 |
| | | | 280/730.2 |
| 2016/0159306 A1* | 6/2016 | Fujiwara | B60R 21/207 |
| | | | 280/728.2 |
| 2018/0222435 A1* | 8/2018 | Fukawatase | B60R 21/23138 |

FOREIGN PATENT DOCUMENTS

| | | |
|---|---|---|
| ES | 2 294 493 | 1/2006 |
| JP | 2006-035988 | 2/2006 |
| JP | 2006-524161 | 10/2006 |
| JP | 2007-510581 | 4/2007 |
| JP | 2007-230310 | 9/2007 |
| JP | 2011-178189 | 9/2011 |
| JP | 2014-031080 | 2/2014 |
| KR | 10-2006-0021298 | 3/2006 |
| KR | 10-2011-0051298 | 5/2011 |

* cited by examiner

SIDE AIRBAG DEVICE

CROSS REFERENCE TO RELATED APPLICATIONS

This application claims priority to Japanese Patent Application No. 2014-129419, filed on Jun. 24, 2014 and PCT/JP2015/063922, filed on May 14, 2015.

FIELD OF THE INVENTION

The present invention relates to a side airbag device installed in a vehicle in order to protect an occupant particularly when the vehicle is involved in a collision from the side (hereinafter, referred to as during a side collision).

BACKGROUND

A side airbag device for protecting an occupant from an impact particularly during a side collision is generally installed in a window-side side interior of a backrest of a seat (hereinafter, referred to as a seat back).

The side airbag device is configured such that, during a side collision, an inflator is operated by an output signal transmitted by a sensor having detected an impact and generates gas to deploy an airbag between an inner-side surface of a vehicle and an occupant.

There are side airbag devices configured as described above which are installed with a tether that assists guidance of a deployment direction of an airbag when the airbag is being deployed (for example, Japanese PCT Application No. 2007-510581).

In the side airbag device disclosed in Japanese PCT Application No. 2007-510581, a tether is attached to an interior of the airbag. For example, a configuration is adopted in which a rear edge of the tether is attached to a rear end side of the airbag and, at the same time, a front edge of the tether is joined to one sheet of base fabric at a location in proximity of a front end side of the airbag.

Moreover, the rear end side of the airbag refers to a portion which constitutes a rearward side of the vehicle when the airbag is deployed. In addition, the front end side of the airbag refers to a portion which constitutes a forward side of the vehicle when the airbag is deployed.

In the case of the side airbag device disclosed in Japanese PCT Application No. 2007-510581, as the airbag is inflated, the airbag is pulled by an action of the tether and expands adjacent to a side surface of the vehicle to the forward side of the vehicle.

With the side airbag device disclosed in the above-referenced document, a tether provided in the interior of the airbag is capable of controlling the deployment direction of the airbag. However, the tether does not have a function of holding the airbag at a deployed position after the airbag is deployed.

A problem to be solved by the present invention is that, while the tether provided in the airbag of the side airbag device disclosed in the above-referenced document is capable of controlling the deployment direction of the airbag, the tether does not have a function of holding the airbag at a deployed position after the airbag is deployed.

An object of the present invention is to solve the problem described above and equip a tensioned tether provided for an airbag with a function of holding the airbag in a desired deployed position after the airbag is deployed.

SUMMARY OF THE INVENTION

Specifically, a side airbag device according to the present invention includes:

an airbag; and an inflator which is provided inside the airbag and which, during a side collision, receives an output signal from a sensor, supplies gas to the airbag in a folded state, and deploys the airbag, a characteristic of the side airbag device being as follows:

the airbag is configured such that a tensioned tether is attached to an outer surface on a side that faces an occupant when deployed, the tensioned tether is shaped such that a vertical length of a front edge thereof which is positioned at a front end of the airbag when deployed is longer than a vertical length of a rear edge thereof which is positioned at a rear end of the airbag when deployed, the front edge is shaped so as to continuously extend in the vertical direction along the front end of the airbag between an upper part of the airbag to be on a ceiling side of a vehicle and a lower part of the airbag to be on a floor side of the vehicle when the airbag is deployed, the rear edge is shaped so as to extend in the vertical direction in the vicinity of the rear end of the airbag between the upper part and the lower part of the airbag when deployed, and the front edge of the tensioned tether is continuously joined in the vertical direction to the vicinity of the front end of the airbag, and the tensioned tether is attached so as to move in the vertical direction and a horizontal direction in a state of being pulled in an oblique direction which is inclined with respect to the vertical direction from the front end to the rear end of the airbag when deployed.

In the present invention, a tensioned tether attached to an outer surface of an airbag on a side that faces an occupant when deployed is shaped such that a vertical length of a front edge of the tensioned tether is longer than a vertical length of a rear edge of the tensioned tether. The front edge of the tensioned tether is shaped so as to continuously extend in a vertical direction along a front end of the airbag between an upper part and a lower part of the airbag when deployed. In addition, the rear edge side of the tensioned tether is shaped so as to continuously extend in the vertical direction in the vicinity of the rear end of the airbag between the upper part and the lower part of the airbag when deployed. The front edge of the tensioned tether is continuously joined in the vertical direction to the vicinity of the front end of the airbag. The rear edge of the tensioned tether is attached to the outer surface of the airbag so that, in a state where the tensioned tether is pulled in an oblique direction which is inclined with respect to the vertical direction from the front end to the rear end of the airbag when deployed, the oblique direction having both vertical and horizontal direction components.

In the present invention, the vertical direction refers to directions toward a floor and a ceiling from a center of a vehicle, and a horizontal direction refers to a direction approximately parallel to a longitudinal direction of the vehicle along a front-rear direction of the vehicle. While descriptions are given based on a two-dimensional paper surface in order to facilitate understanding in the present invention, it is to be understood that the present invention also includes changes in three-dimensional directions toward front and back sides of the paper surface.

While a shape of the front edge of the tensioned tether and a shape of the front end of the airbag favorably match, the shapes need not necessarily be the same as long as the front edge of the tensioned tether is joined to the vicinity of the front end of the airbag.

The oblique direction is a direction which combines a horizontal direction component with respect to a vehicle longitudinal direction with a vertical direction component that is perpendicular to the horizontal direction. The oblique direction of the tensioned tether which is inclined with respect to the vertical direction favorably matches a vectorially combined direction of the vertical direction component and the horizontal direction component in which the oblique direction moves. In addition, favorably, the oblique direction is a direction in which a vehicle forward side of the tensioned tether is positioned upward relative to a vehicle rearward side of the tensioned tether.

Furthermore, favorably, movements of the oblique direction in the vertical direction and the horizontal direction are respectively approximately parallel movements. In the present invention, being approximately parallel includes not only a parallel state but also inclined states within a range of ±20 degrees from parallel. This is because, after the airbag is deployed, the deployment can be maintained and the shape can be retained within this range.

In other words, in the present invention, during deployment, the airbag is deployed in a state where the airbag is effectively pulled in the oblique direction of the vehicle by the tensioned tether. Therefore, when an occupant collides with the airbag after deployment, the airbag can be prevented from rotating in a direction separating from a seat, that is moving laterally in an outboard direction relative to the associated vehicle.

The attachment of the rear edge of the tensioned tether such that, in a state where the tensioned tether is pulled in an oblique direction which is inclined with respect to the vertical direction from the front end to the rear end of the airbag, the oblique direction moves approximately parallelly in vertical and horizontal directions is realized by, for example, fitting a stud bolt of the inflator into a hole provided on the rear edge of the tensioned tether.

In the present invention, since the airbag can be prevented from rotating in a direction separating from a seat when the occupant collides with the airbag after deployment, an occupant-protecting function of the airbag can be improved.

Therefore, the present invention is particularly effective in a side airbag device installed in a seat portion of a vehicle which does not have a pressure wall (door) or reaction surface that prevents the airbag from rotating after being deployed or, even if there is a door, the door is at a distance from a driver's seat (for example, an ultra-small mobility vehicle or the like in which both sides of the driver's seat constitute side walls of a vehicle) or in a side airbag device installed in a seat portion on a side far from the door (for example, a passenger seat-side side surface in the case of a driver's seat and a driver's seat-side side surface in the case of a passenger seat: hereinafter, referred to as a far side).

DETAILED DESCRIPTION

There are side airbag devices installed with a tether which assists guidance of a deployment direction of an airbag when the airbag is being deployed. However, while a conventional tether has a function of controlling the deployment direction of an airbag, the tether generally does not have a function of holding the airbag at a deployed position after the airbag is deployed.

The present invention is designed to solve the problem described above by determining a shape and an attachment mode of a tensioned tether such that, when an airbag is being deployed, the tensioned tether respectively moves approximately parallelly in a vertical direction and a horizontal direction in a state of being pulled in an oblique direction that is inclined with respect to the vertical direction.

Figure 1:
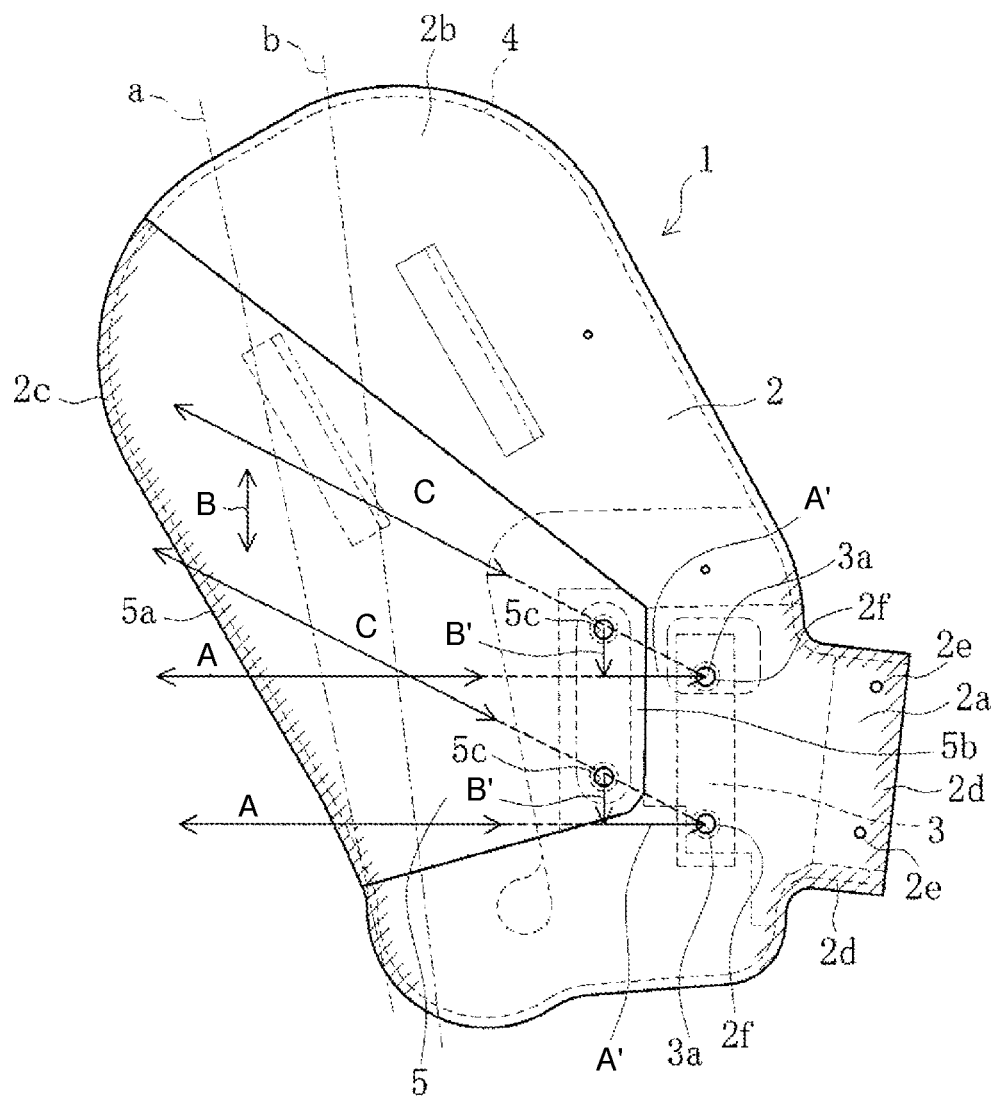
FIG. 1 is a diagram showing a deployed state of an airbag of a side airbag device according to the present invention from a side direction of a vehicle.
Figure 2:
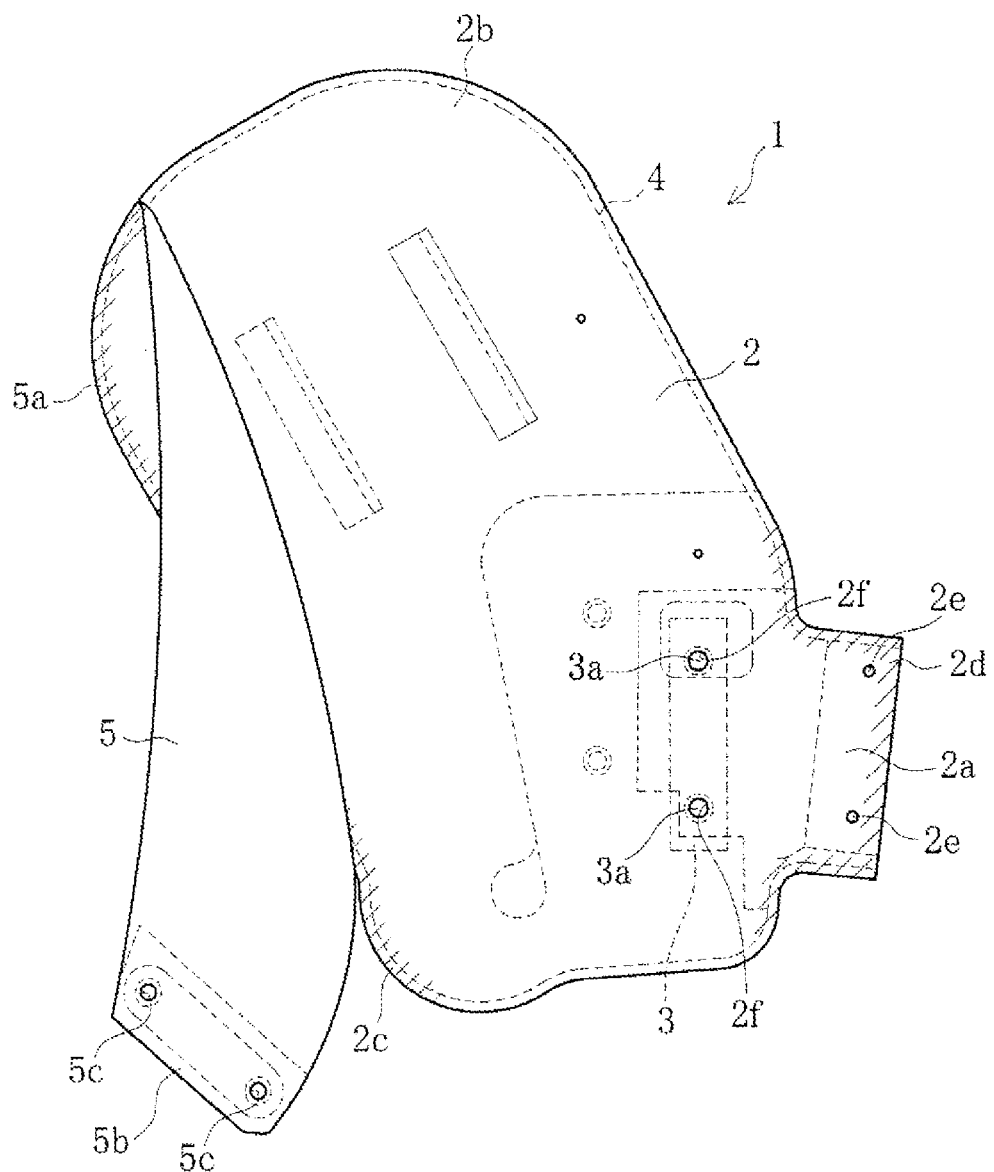
FIG. 2 is a diagram showing a tensioned tether being folded in FIG. 1.
Figure 3:
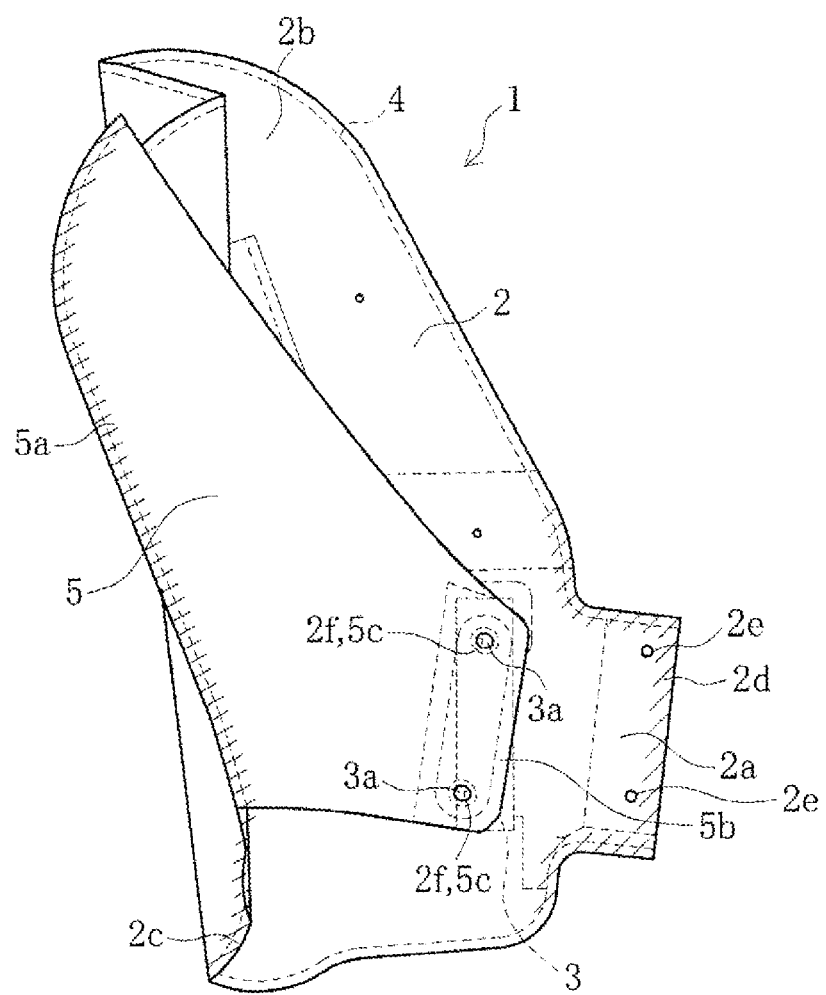
FIG. 3 is a diagram showing a state where, in FIG. 1, a rear edge of the tensioned tether is attached by a hole through which a stud bolt of an inflator of an airbag is to be inserted.

Hereinafter, a practical example of the present invention will be described with reference to the accompanying drawings. FIGS. 1 to 3 are diagrams illustrating an example of a side airbag device according to the present invention.

Reference numeral 1 denotes the side airbag device according to the present invention to be installed in, for example, a far-side side interior of a seat back.

The side airbag device 1 includes an airbag 2 and an inflator 3 which receives an output signal from a sensor and ejects gas. For example, the side airbag device 1 deploys the airbag 2 in a vehicle forward direction between an occupant seated on a driver's seat and a passenger seat to protect the occupant particularly during a side collision.

For example, the inflator 3 has a cylindrical shape and is configured to inject gas into the airbag 2 through an injection hole provided on an outer surface thereof. For example, two stud bolts 3a for fixing protrude from the outer surface of the inflator 3 at an appropriate interval in a longitudinal direction of the inflator 3, and the airbag 2 is installed on a frame of a side end of the seat back using these stud bolts 3a.

The airbag 2 is configured such that, for example, entire circumferences of two sheets of a base fabric are sewn together to form a bag shape, and includes a rectangular protruding member 2a which is folded back onto a surface of the airbag 2 in order to prevent injected gas from leaking after the inflator 3 is inserted into the airbag 2, and a main body portion 2b which protects an occupant during deployment.

A hole 2e into which the stud bolt 3a of the inflator 3 is to be inserted is provided on the protruding portion 2a. When folding back the protruding portion 2a, the stud bolt 3a is inserted through the hole 2e on the protruding portion 2a having been folded back and an through insertion hole 2f for the stud bolt 3a provided on the main body portion 2b of the airbag 2. The inflator 3 is arranged in the vicinity of the protruding portion 2a inside the main body portion 2b. Reference numeral 4 in FIGS. 1 to 3 denotes a sewing line or seam.

Reference numeral 5 denotes a tensioned tether attached to a side of the airbag 2 which faces the occupant when the airbag 2 is deployed.

In the present invention, the tensioned tether 5 is configured to have a shape such that a vertical length of a front edge 5a thereof which is positioned at a front end 2c of the airbag 2 when deployed is longer than a vertical length of a rear edge 5b thereof which is positioned at a rear end 2d of the airbag 2 when deployed.

In addition, the front edge 5a of the tensioned tether 5 is shaped so as to continuously extend in a vertical direction along the front end 2c of the airbag 2 between an upper part of the airbag 2 to constitute a ceiling side of the vehicle and a lower part of the airbag 2 to constitute a floor side of the vehicle when deployed. In the practical example, the front edge 5a is sewn together with the vicinity of the front end 2c of the airbag 2 so as to be continuous in the vertical direction (refer to FIG. 2).

On the other hand, the rear edge 5b of the tensioned tether 5 is shaped so as to continuously extend in the vertical direction along the vicinity of the rear end 2d of the airbag 2 between the upper part and the lower part of the airbag 2 when deployed and is attached to the vicinity of the rear end 2d of the airbag 2.

The attachment causes the tensioned tether 5 to be pulled in an oblique direction (a direction of arrow C in FIG. 1) which is inclined in the vertical direction from the front end 2c toward the rear end 2d of the airbag 2 when the airbag 2 is being deployed. The tensioned tether 5 is attached to the outer surface of the airbag 2 such that, in this state, the tensioned tether 5 respectively moves a prescribed distance approximately parallelly in the vertical direction (a direction of an arrow B' in FIG. 1) and a horizontal direction (a direction of an arrow A' in FIG. 1).

The oblique direction is a direction which combines horizontal direction component (in the direction of an arrow A in FIG. 1) with respect to a vehicle longitudinal direction with a vertical direction component (in the direction of an arrow B in FIG. 1) that is perpendicular to the horizontal direction. For example, the oblique direction is a direction (the direction of arrow C in FIG. 1) in which a vehicle forward side of the tensioned tether 5 is positioned upward relative to a vehicle rearward side of the tensioned tether 5.

By changing prescribed distances (for example, B' and A' in FIG. 1) of movements in the vertical direction and the horizontal direction, an angle of the oblique direction (the direction of arrow C in FIG. 1) can be arbitrarily set. Favorably, the oblique direction is matched with a composite vector direction of a vertical direction component and a horizontal direction component of movement. Accordingly, tension appropriately acts on the entire tensioned tether 5 when the airbag 2 is being deployed.

As means for attaching the tensioned tether 5 in this manner, for example, the tensioned tether 5 may be attached by providing holes 5c for inserting the two stud bolts 3a of the inflator 3 on the rear edge 5b of the tensioned tether 5 and respectively fitting the stud bolts 3a of the inflator 3 into the holes 5c.

In doing so, by folding the airbag 2 at a line denoted by "a" and a line denoted by "b" in FIG. 1, the stud bolts 3a of the inflator 3 arranged inside the airbag 2 can be fitted into the holes 5c provided on the rear edge 5b of the tensioned tether 5 as shown in FIG. 3. FIG. 1 shows airbag 2 laid flat before the tether 5 is affixed to inflator stud bolt 3a by placing rear edge 5b such that tether holes 5c are positioned over the stud bolts.

Moreover, the side airbag device 1 according to the present invention may be installed inside a seat back of a seat of the vehicle in a state where the airbag 2 in the state shown in FIG. 3 is folded in a roll shape.

With the side airbag device 1 described above, one tensioned tether 5 provided on an occupant side is to maintain, in a state where the airbag 2 is pulled in an oblique direction of the vehicle, a state where the oblique direction is moved approximately parallelly to the vertical direction and the horizontal direction. Therefore, the airbag 2 can be prevented from rotating in a direction separating laterally from a seat when an occupant collides with the airbag 2 after deployment and an occupant-protecting function can be improved.

The side airbag device 1 described above is particularly effective in the case of a side airbag device installed in a seat portion of a vehicle which does not have a pressure wall (door) or reaction surface that prevents the airbag 2 from rotating after being deployed or, even if there is a door, the door is at a distance from a driver's seat (for example, an ultra-small mobility or the like in which both sides of the driver's seat constitute edges of a vehicle) or a side airbag device installed in a far-side seat portion.

The present invention is not limited to the example described above and embodiments may be modified as appropriate within the scope of the technical concepts described in the respective claims.

In other words, the side airbag device described above represents a preferred example of the present invention and other embodiments can also be performed or implemented using various methods. In particular, unless it is described in the present specification that restrictions apply, the present invention is not restricted to a detailed shape, size, configuration and arrangement, and the like of components illustrated in the accompanying drawings. Furthermore, the expressions and terms in the present specification have been used for explanatory purposes and are not restrictive unless it is described in the present specification that restrictions apply.

For example, the rear edge 5b of the tensioned tether 5 may be attached to the vicinity of the rear end 2d of the airbag 2 by sewing the rear edge 5b of the tensioned tether 5 to the vicinity of the rear end 2d of the airbag 2.

While the above description constitutes the preferred embodiment of the present invention, it will be appreciated that the invention is susceptible to modification, variation and change without departing from the proper scope and fair meaning of the accompanying claims.

The invention claimed is:

1. A side airbag for a vehicle for providing impact restraint for an occupant adapted to be assembled with an inflator which is provided inside the airbag and deployed in a side collision, the inflator upon receiving an output signal from a sensor, supplies a gas to the airbag in a folded state, and deploys the airbag, comprising:
   a tether attached to an outer surface of the airbag on a side of the airbag that faces the occupant of the vehicle when the airbag is deployed,
   the tether is shaped such that a vertical length of a front edge of the tether is positioned at a front end of the airbag when deployed is longer than a vertical length of a rear edge of the tether which is positioned at a rear end of the airbag when deployed,
   the front edge is shaped so as to continuously extend in the vertical direction along the front end of the airbag between an upper part of the airbag on a ceiling side of the vehicle and a lower part of the airbag on a floor side of the vehicle when the airbag is deployed,
   the rear edge is shaped so as to extend in the vertical direction in a vicinity of the rear end of the airbag between the upper part and the lower part of the airbag when deployed, and
   the front edge of the tether is continuously joined in the vertical direction to a vicinity of the front end of the airbag, and the tether is attached so as to move in the vertical direction and a horizontal direction in a state of being pulled in an oblique direction which is inclined with respect to the vertical direction from the front end to the rear end of the airbag when deployed, and
   the airbag is formed of at least two blanks of fabric material joined together at perimeter edges, wherein the rear edge of the tether is attached to the rear end of the airbag by providing a hole for inserting a stud bolt of the inflator on the rear edge of the tether and fitting the stud bolt into the hole, the airbag blanks and the tether configured such that the airbag blanks must be folded or rolled in order to extend the tether such that the hole fits over the stud bolt.

2. The side airbag device according to claim 1, further comprising wherein the airbag is to be provided on a far side of the vehicle with respect to the occupant.

3. The side airbag device according to claim 1, further comprising, wherein the oblique direction is a direction which combines a horizontal direction component with respect to the horizontal direction with a vertical direction component that is perpendicular to the horizontal direction, and in which a vehicle forward side of the tether is positioned upward relative to a vehicle rearward side of the tether.

4. The side airbag device according to claim 3, further comprising wherein movements in the vertical direction component and the horizontal direction component are approximately parallel to the respective directions.

5. A side airbag for a vehicle for providing impact restraint for an occupant adapted to be assembled with an inflator which is provided inside the airbag and deployed in a side collision, the inflator upon receiving an output signal from a sensor, supplies a gas to the airbag in a folded state, and deploys the airbag, comprising:

a tether attached to an outer surface of the airbag on a side of the airbag that faces the occupant of the vehicle when the airbag is deployed, the tether is shaped such that a vertical length of a front edge of the tether is positioned at a front end of the airbag when deployed is longer than a vertical length of a rear edge of the tether which is positioned at a rear end of the airbag when deployed, the front edge is shaped so as to continuously extend in the vertical direction along the front end of the airbag between an upper part of the airbag on a ceiling side of the vehicle and a lower part of the airbag on a floor side of the vehicle when the airbag is deployed, the rear edge is shaped so as to extend in the vertical direction in a vicinity of the rear end of the airbag between the upper part and the lower part of the airbag when deployed, and the front edge of the tether is continuously joined in the vertical direction to a vicinity of the front end of the airbag, and the tether is attached so as to move in the vertical direction and a horizontal direction in a state of being pulled in an oblique direction which is inclined with respect to the vertical direction from the front end to the rear end of the airbag when deployed, and the airbag is formed of at least two blanks of fabric material joined together at perimeter edges, wherein the rear edge of the tether is attached to the rear end of the airbag by providing a hole for inserting a stud bolt of the inflator on the rear edge of the tether and fitting the stud bolt into the hole, the airbag blanks and the tether configured such that when the airbag blanks and the tether are laid flat the hole is displaced from the inflator stud bolt along an oblique line having a vertical component extended downwardly and a horizontal component extending in a rearward direction, and upon displacing the tether and the hole to fit over the stud bolt, the fabric blanks become rolled or folded.

6. The side airbag device according to claim 5 further comprising, wherein the airbag is to be provided on a far side of the vehicle with respect to the occupant.

7. The side airbag device according to claim 5 further comprising, wherein the oblique direction is a direction which combines a horizontal direction component with respect to the horizontal direction with a vertical direction component that is perpendicular to the horizontal direction, and in which a vehicle forward side of the tether is positioned upward relative to a vehicle rearward side of the tether.

8. The side airbag device according to claim 7 further comprising, wherein movements in the vertical direction component and the horizontal direction component are approximately parallel to the respective directions.

* * * * *